United States Patent
Gallegos-Lopez et al.

(10) Patent No.: US 8,729,847 B2
(45) Date of Patent: May 20, 2014

(54) METHODS, SYSTEMS AND APPARATUS FOR GENERATING CURRENT COMMANDS USED TO CONTROL OPERATION OF AN ELECTRIC MACHINE

(75) Inventors: Gabriel Gallegos-Lopez, Lomita, CA (US); Michael H. Kinoshita, Redondo Beach, CA (US); Milun Perisic, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 250 days.

(21) Appl. No.: 13/344,236

(22) Filed: Jan. 5, 2012

(65) Prior Publication Data

US 2013/0175960 A1   Jul. 11, 2013

(51) Int. Cl.
  *H02P 6/00*   (2006.01)
  *H02P 21/00*  (2006.01)

(52) U.S. Cl.
  CPC .................................... *H02P 21/00* (2013.01)
  USPC ............ 318/432; 318/433; 318/434; 318/436

(58) Field of Classification Search
  CPC ...................................................... H02P 21/00
  USPC .................................. 318/432, 433, 434, 436
  See application file for complete search history.

(56) References Cited

U.S. PATENT DOCUMENTS

| | | | |
|---|---|---|---|
| 5,679,944 A * | 10/1997 | Cusey et al. | ........... 235/492 |
| 2002/0145837 A1 | 10/2002 | Krefta et al. | |
| 2010/0253252 A1 | 10/2010 | Schulz et al. | |
| 2011/0140643 A1 | 6/2011 | Wu | |

FOREIGN PATENT DOCUMENTS

WO    2011124346 A2    10/2011

OTHER PUBLICATIONS

German Patent and Trade Mark Office, Office Action for German Patent Application No. 10 2012 223 896.4, mailed Dec. 19, 2013.

* cited by examiner

*Primary Examiner* — Bentsu Ro
*Assistant Examiner* — David Luo
(74) *Attorney, Agent, or Firm* — Ingrassia Fisher & Lorenz, P.C.

(57) ABSTRACT

Embodiments of the present disclosure relate to methods, systems and apparatus for mapping torque to current to generate current commands used to control operation of an electric machine. Based on a DC input voltage, lookup tables (LUTs) are selected. Each of the selected LUTs includes a plurality (B) of first entries that correspond a particular input value of an angular rotation speed of the electric machine, and a set of coefficients are output from each of the selected LUTs that can be applied within a first polynomial function to generate a plurality of first polynomial functions each having a different sets of coefficients. A plurality of particular output values for a first current command are generated via the plurality of first polynomial functions. The particular output values for the first current command can be interpolated to generate a final output value for the first current command.

20 Claims, 7 Drawing Sheets

METHODS, SYSTEMS AND APPARATUS FOR GENERATING CURRENT COMMANDS USED TO CONTROL OPERATION OF AN ELECTRIC MACHINE

TECHNICAL FIELD

The technical field generally relates to techniques for controlling operation of multi-phase systems, and more particularly relates to methods, systems and apparatus for generating current commands used to control a multi-phase electric machine.

BACKGROUND

Electric machines are utilized in a wide variety of applications. For example, hybrid/electric vehicles (HEVs) typically include an electric traction drive system that includes an alternating current (AC) electric machine which is driven by a power converter with a direct current (DC) power source, such as a storage battery. Machine windings of the AC electric machine can be coupled to inverter sub-modules of a power inverter module (PIM). Each inverter sub-module includes a pair of switches that switch in a complementary manner to perform a rapid switching function to convert the DC power to AC power. This AC power drives the AC electric machine, which in turn drives a shaft of the HEV's drivetrain.

As used herein, the term "multi-phase" refers to two or more phases, and can be used to refer to electric machines that have two or more phases. A multi-phase electric machine typically includes a multi-phase PWM inverter module that drives one or more multi-phase AC machine(s). One example of such a multi-phase electric machine is a three-phase AC machine. In a three-phase system, a three-phase pulse width modulated (PWM) inverter module drives one or more three-phase AC machine(s). For example, some traditional HEVs implement two three-phase PWM inverter modules and two three-phase AC machines (e.g., AC motors) each being driven by a corresponding one of the three-phase PWM inverter modules that it is coupled to.

In many systems, the inverter modules are driven by switching vector signals that are generated based on voltage command signals. The voltage command signals are generated based on current command signals that are provided from a torque-to-current mapping module. In such systems, the torque-to-current mapping module receives a torque command signal ($Te^*$), an angular rotation speed ($\omega r$) of the machine, and a DC input voltage ($V_{DC}$) as inputs, and maps these inputs to current commands that will ideally cause the machine to generate the commanded torque ($Te^*$) at a given machine speed ($\omega r$).

A conventional torque-to-current mapping module is implemented using a set of lookup tables (LUTs). These LUTs are typically stored in read-only memory (ROM), which is a limited memory resource in many electric machine drive systems. As such, one drawback associated with the conventional torque-to-current mapping module is that the LUTs require a significant amount of memory resources, which can, in some cases, exceed the amount of memory available.

It would be desirable to provide improved methods, systems and apparatus for generating current commands used to control a multi-phase electric machine. It would also be desirable to provide improved methods, systems and apparatus for mapping torque commands to current commands that consume less memory resources. Other desirable features and characteristics of the present invention will become apparent from the subsequent detailed description and the appended claims, taken in conjunction with the accompanying drawings and the foregoing technical field and background.

SUMMARY

Embodiments of the present disclosure relate to methods, systems and apparatus for controlling operation of an electric machine in a vector controlled motor drive system that includes an inverter module that drives the electric machine when the electric machine operates in an overmodulation region.

In accordance with one of the disclosed embodiments, a method is provided for mapping torque to current to generate a first current command. Based on a DC input voltage, selected ones of a first plurality (N) of lookup tables (LUTs) are selected. Each of the selected LUTs includes a plurality (B) of first entries. Each first entry comprises a set of coefficients that correspond to a corresponding input value of an angular rotation speed of an electric machine. In response to a particular input value of the angular rotation speed of the electric machine, a set of coefficients from each of the selected ones of the first plurality (N) of LUTs are output. Each of the sets of coefficients output from each of the selected ones of the first plurality of LUTs are applied within a first polynomial function to generate a plurality of first polynomial functions each having a different one of the sets of coefficients. Each of the plurality of first polynomial functions is a function of a torque command signal. In response to a particular input value of a torque command signal, a plurality of particular output values for a first current command are generated via the plurality of first polynomial functions. In accordance with some of the disclosed embodiments, the particular output values for a first current command can be interpolated to generate a final output value for the first current command. A similar method can be used to generate a final output value for another current command.

In accordance with one of the disclosed embodiments, a torque-to-current mapping module is provided that includes a first current command generator module that includes a first plurality (N) of lookup tables (LUTs), a table selection module, and a polynomial function module. Each of the first plurality (N) of LUTs includes a plurality (B) of first entries, wherein each first entry comprises a set of coefficients. The table selection module can select, based on a DC input voltage, selected ones of the first plurality of LUTs, each of which are configured to output a set of coefficients in response to a particular input value of an angular rotation speed of an electric machine. The polynomial function module is a function of a torque command signal and is configured to implement the sets of coefficients output from the selected ones of the first plurality of LUTs within a first polynomial function, and to generate, in response to a particular input value of a torque command signal, particular output values for a first current command.

In accordance with one of the disclosed embodiments, a current command generator module is provided that includes a first plurality (N) of one-dimensional lookup tables (LUTs), a table selection module, and a polynomial function module. The first plurality (N) of one-dimensional LUTs each include a plurality (B) of first entries. Each first entry corresponds to a particular input value of an angular rotation speed of an electric machine. Each first entry comprises a particular first set of coefficients, wherein each particular first set of coefficients comprises: a number (X) of coefficients that is greater than or equal to 2. The table selection module can select, based on a DC input voltage, selected ones of the first plurality of one-dimensional LUTs, each of which are configured to output a set of coefficients in response to a particular input value of an angular rotation speed of an electric machine. The polynomial function module is a function of a torque command signal. The polynomial function module can implement each of the sets of coefficients (that are output from the selected ones of the first plurality of one-dimensional LUTs) within an instance of a first X−1th degree polynomial function. The polynomial function module can generate, in response to a particular input value of a torque command signal, particular output values for a first current command. The interpolation processing module can interpolate the particular output values for a first current command to generate a final output value for the first current command.

DESCRIPTION OF THE DRAWINGS

Embodiments of the present disclosure will hereinafter be described in conjunction with the following drawing figures, wherein like numerals denote like elements.

DESCRIPTION OF EXEMPLARY EMBODIMENTS

Figure 1:
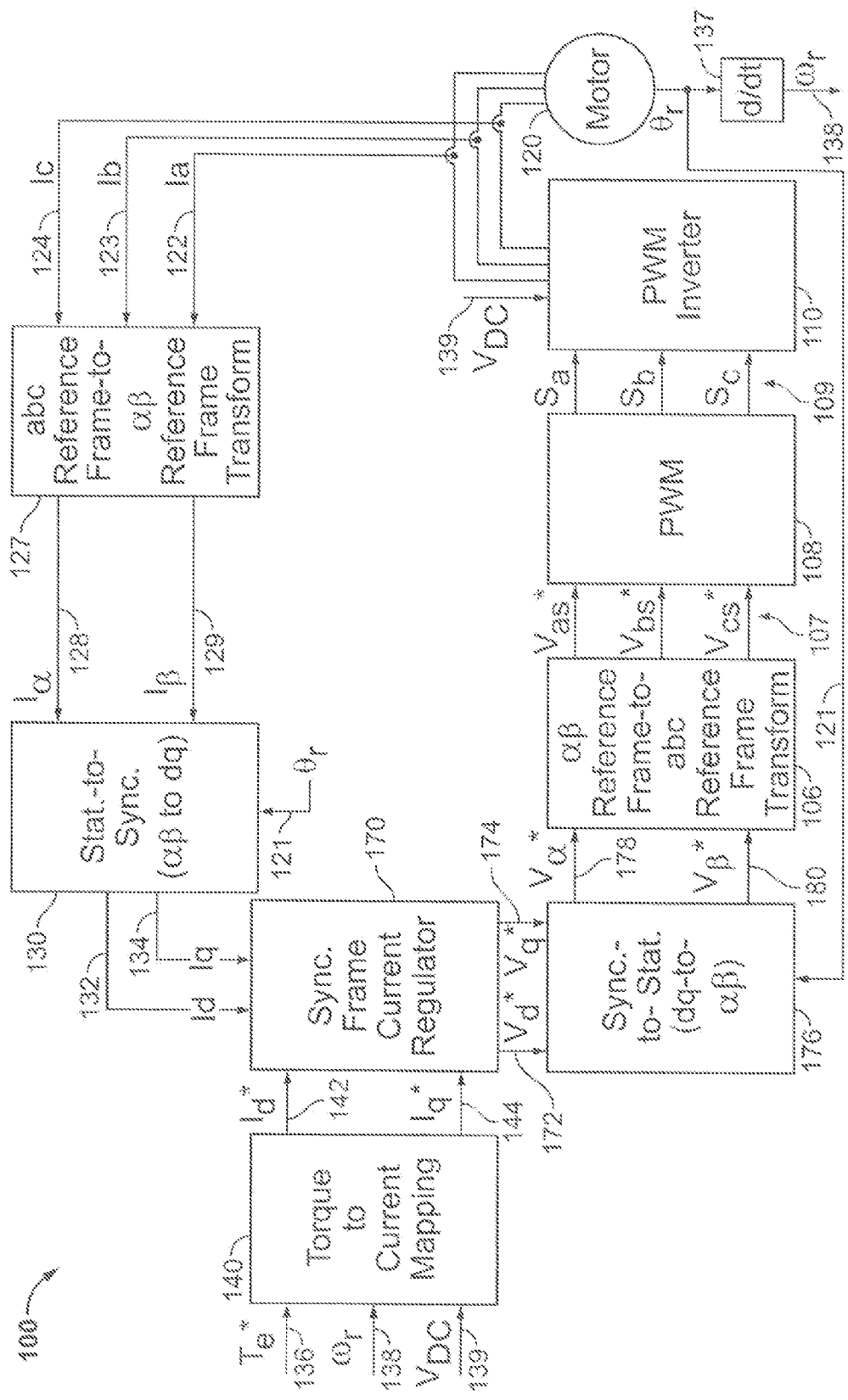
FIG. 1 is a block diagram of one example of a motor drive system in accordance with some of the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to generating current commands used for controlling operation of a multi-phase system. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for generating current commands used for controlling operation of a multi-phase system, as described herein. As such, these functions may be interpreted as steps of a method for generating current commands used for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods, systems and apparatus for generating current commands used for controlling operation of a multi-phase system. In one exemplary implementation, the multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to generate current commands used for controlling operation of a multi-phase system when the multi-phase machine is operating in its overmodulation region. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous.

FIG. 1 is a block diagram of one example of a vector controlled motor drive system 100 in accordance with the disclosed embodiments. The system 100 controls a three-phase AC machine 120 via a three-phase pulse width modulated (PWM) inverter module 110 coupled to the three-phase AC machine 120 so that the three-phase AC machine 120 can efficiently use a DC input voltage (Vdc) 139 provided to the three-phase PWM inverter module 110 by adjusting current commands that control the three-phase AC machine 120. In one particular implementation, the vector controlled motor drive system 100 can be used to control torque in an HEV.

In the following description of one particular non-limiting implementation, the three-phase AC machine 120 is embodied as a three-phase AC powered motor 120, and in particular a three-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes fewer or more phases.

The three-phase AC motor 120 is coupled to the three-phase PWM inverter module 110 via three inverter poles and generates mechanical power (Torque×Speed) based on three-phase sinusoidal current signals 122 ... 124 received from the PWM inverter module 110. In some implementations, the angular position 121 of a rotor (θr) of the three-phase AC motor 120 or "shaft position" is measured using a position sensor (not illustrated), and in other implementations, the angular position 121 of a rotor (θr) of the three-phase AC motor 120 can be estimated without using a position sensor by using sensorless position estimation techniques.

The vector control motor drive system 100 includes a torque-to-current mapping module 140, a synchronous (SYNC.) frame current regulator module 170, a synchronous-to-stationary (SYNC.-TO-STAT.) transformation module 176, an αβ reference frame-to-abc reference frame (αβ-to-abc) transformation module 106, a pulse width modulation (PWM) module 108, a three-phase PWM inverter 110, an abc reference frame-to-αβ reference frame (abc-to-αβ) transformation module 127, and a stationary-to-synchronous (STAT.-TO-SYNC.) transformation module 130.

The torque-to-current mapping module 140 receives a torque command signal (Te*) 136, angular rotation speed (ωr) 138 of the shaft that is generated at block 137 based on the derivative of the rotor/shaft position output (θr) 121, and the DC input voltage ($V_{DC}$) 139 as inputs, along with possibly a variety of other system parameters depending upon implementation. The torque-to-current mapping module 140 uses these inputs to generate a d-axis current command (Id*) 142 and a q-axis current command (Iq*) 144 that will cause the motor 120 to generate the commanded torque (Te*) at speed (ωr) 138. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time.

The abc-to-αβ transformation module 127 receives the measured three-phase stationary reference frame feedback stator currents (Ia ... Ic) 122-124 that are fedback from motor 120. The abc-to-αβ transformation module 127 uses these three-phase stationary reference frame feedback stator currents 122-124 to perform an abc reference frame-to-αβ reference frame transformation to transform the three-phase stationary reference frame feedback stator currents 122-124 into stationary reference frame feedback stator currents (Iα, Iβ) 128, 129. The abc-to-αβ transformation is well-known in the art and for sake of brevity will not be described in detail.

The stationary-to-synchronous transformation module 130 receives the stationary reference frame feedback stator currents (Iα, Iβ) 128, 129 and the rotor angular position (θr) 121 and generates (e.g., processes or converts) these stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are DC commands that have a constant value as a function of time for steady state operation. The process of current to voltage conversion can be implemented as a Proportional-Integral (PI) controller, which is known in the art and for sake of brevity will not be described in detail. Because the current commands are DC signals in the synchronous reference frame they are easier to regulate in comparison to AC stationary reference frame current commands.

The synchronous-to-stationary transformation module 176 receives the synchronous reference frame d-axis voltage command signal (Vd*) 172 and the synchronous reference frame q-axis voltage command signal (Vq*) 174 as inputs along with the rotor position output (θr) 121, and performs a dq-to-αβ transformation to generate an α-axis stationary reference frame voltage command signal (Vα*) 178 and a β-axis stationary reference frame voltage command signal (Vβ*) 180. The stationary reference frame α-axis and β-axis voltage command signals (Vα*, Vβ*) 178, 180 are in the stationary reference frame and therefore have values that vary as a sine wave as a function of time. The process of synchronous-to-stationary conversion is well-known in the art and for sake of brevity will not be described in detail.

The αβ-to-abc transformation module 106 receives the stationary reference frame voltage command signals (Vα*, Vβ*) 178, 180, and based on these signals, generates stationary reference frame voltage command signals (Vas* ... Vcs*) 107 (also referred to as "phase voltage command signals") that are sent to the PWM module 108. The αβ-to-abc transformation is well-known in the art and for sake of brevity will not be described in detail.

The three-phase PWM inverter module 110 is coupled to the PWM module 108. The PWM module 108 is used for the control of PWM of the phase voltage command signals (Vas* ... Vcs*) 107. The switching vector signals (Sa ... Sc)

109 are generated based on duty cycle waveforms that are not illustrated in FIG. 1, but are instead internally generated at the PWM module 108 to have a particular duty cycle during each PWM period. The PWM module 108 modifies the phase voltage command signals (Vas* . . . Vcs*) 107 based on the duty cycle waveforms (not illustrated in FIG. 1) to generate switching vector signals (Sa . . . Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered machine 120 at varying speeds based on the DC input 139.

The switching vector signals (Sa . . . Sc) 109 control the switching states of switches in PWM inverter 110 to generate three-phase voltage commands at each phase A, B, C. The switching vector signals (Sa . . . Sc) 109 are PWM waveforms that have a particular duty cycle during each PWM period that is determined by the duty cycle waveforms that are internally generated at the PWM module 108.

The three-phase PWM inverter module 110 receives the DC input voltage (Vdc) and switching vector signals (Sa . . . Sc) 109, and uses them to generate three-phase alternating current (AC) voltage signal waveforms at inverter poles that drive the three-phase AC machine 120 at varying speeds ($\omega r$) 138.

The three-phase machine 120 receives the three-phase voltage signals generated by the PWM inverter 110 and generates a motor output at the commanded torque Te* 136.

Although not illustrated in FIG. 1, the system 100 may also include a gear coupled to and driven by a shaft of the three-phase AC machine 120. The measured feedback stator currents (Ia-Ic) 122-124 are sensed, sampled and provided to the abc-to-$\alpha\beta$ transformation module 127 as described above.

Figure 2:
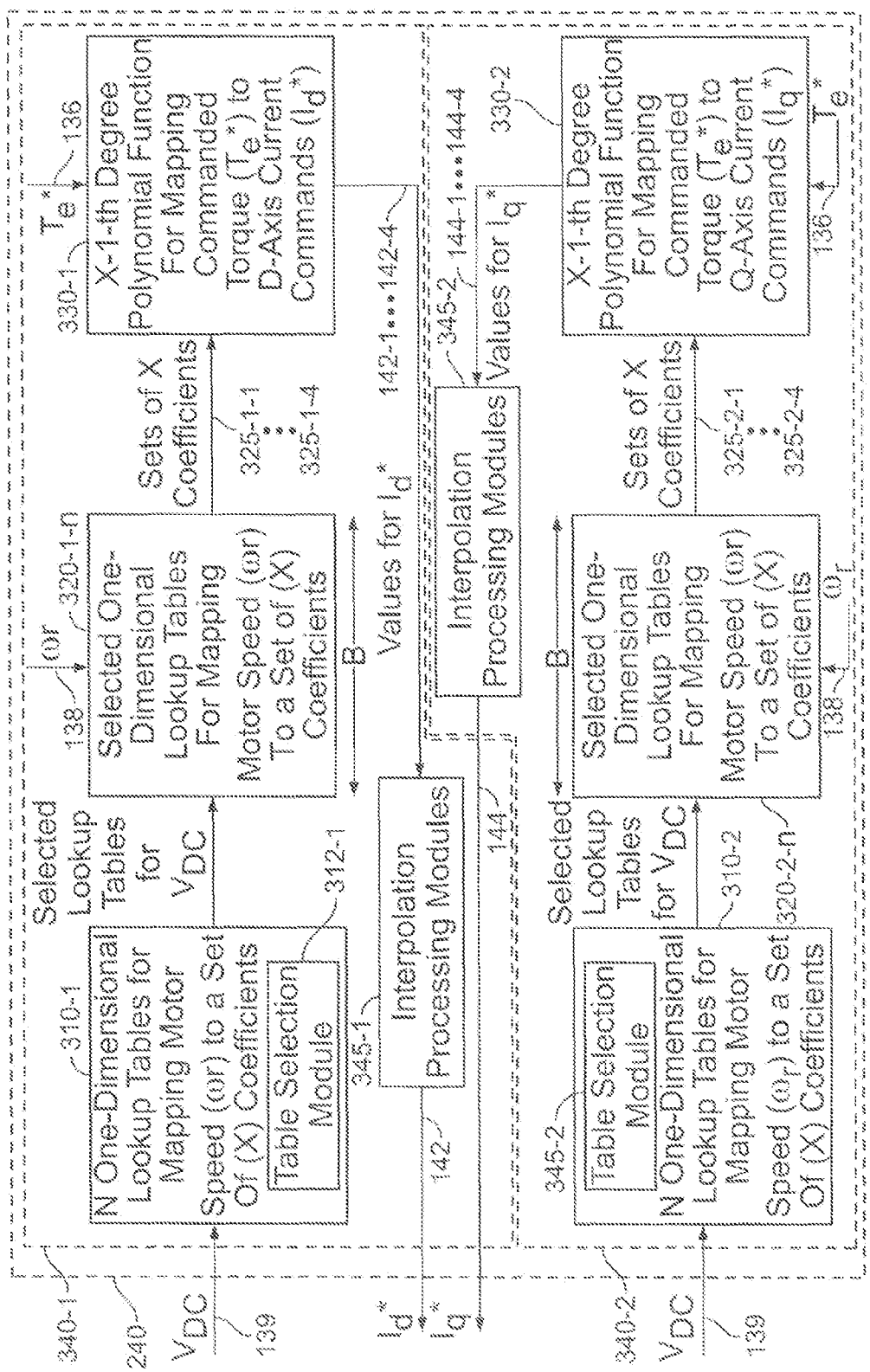
FIG. 2 is a block diagram of a torque-to-current mapping module in accordance with some of the disclosed embodiments.

FIG. 2 is a block diagram of a torque-to-current mapping module 240 in accordance with one exemplary implementation of some of the disclosed embodiments. The torque-to-current mapping module 240 includes a d-axis current command (Id*) generator module 340-1, and a q-axis current command (Iq*) generator module 340-2. The description of each is similar, and for sake of brevity only the d-axis current command (Id*) generator module 340-1 will be described below.

The d-axis current command (Id*) generator module 340-1 includes a module 310-1 that has a first plurality (N) of one-dimensional lookup tables (LUTs) 310-1-1 . . . 310-1-$n$ and a table selection module 312-1, one-dimensional lookup tables (LUTs) 320-1-1 . . . 320-1-$n$, a polynomial function module 330-1, and an interpolation processing module 345-1.

The first plurality (N) of one-dimensional lookup tables (LUTs) 320-1-1 . . . 320-1-$n$, each include a plurality (B) of first entries. Each first entry corresponds to a particular input value of an angular rotation speed ($\omega r$) 138 of an electric machine, and includes a particular first set of coefficients. Each particular first set of coefficients comprises a number (X) of coefficients that is greater than or equal to 2.

The table selection module 312-1 is configured to select, based on a DC input voltage ($V_{DC}$) 139, selected ones of the first plurality of one-dimensional LUTs 320-1-$n$1. The selected ones of the first plurality of one-dimensional LUTs 320-1-$n$1 are each configured to output a set of coefficients 325-1-1 . . . 325-1-4 in response to a particular input value of an angular rotation speed ($\omega r$) 138 of the electric machine.

The polynomial function module 330-1 implements multiple instances of a X–1th polynomial function that is a function of a torque command signal (Te*) 136. Each instance of the polynomial function is configured to implement a different one of the sets of coefficients 325-1-1 . . . 325-1-4 output from the selected ones of the first plurality of one-dimensional LUTs within the X–1th first degree polynomial function, and to generate, in response to a particular input value of a torque command signal (Te*) 136, particular output values for a first current command (Id*) 142-1, 142-2, 142-3 142-4.

The interpolation processing module 345-1 interpolates the particular output values for a first current command (Id*) 142-1, 142-2, 142-3, 142-4 to generate a final output value for the first current command (Id*) 142-7.

Figures 1, 3A:
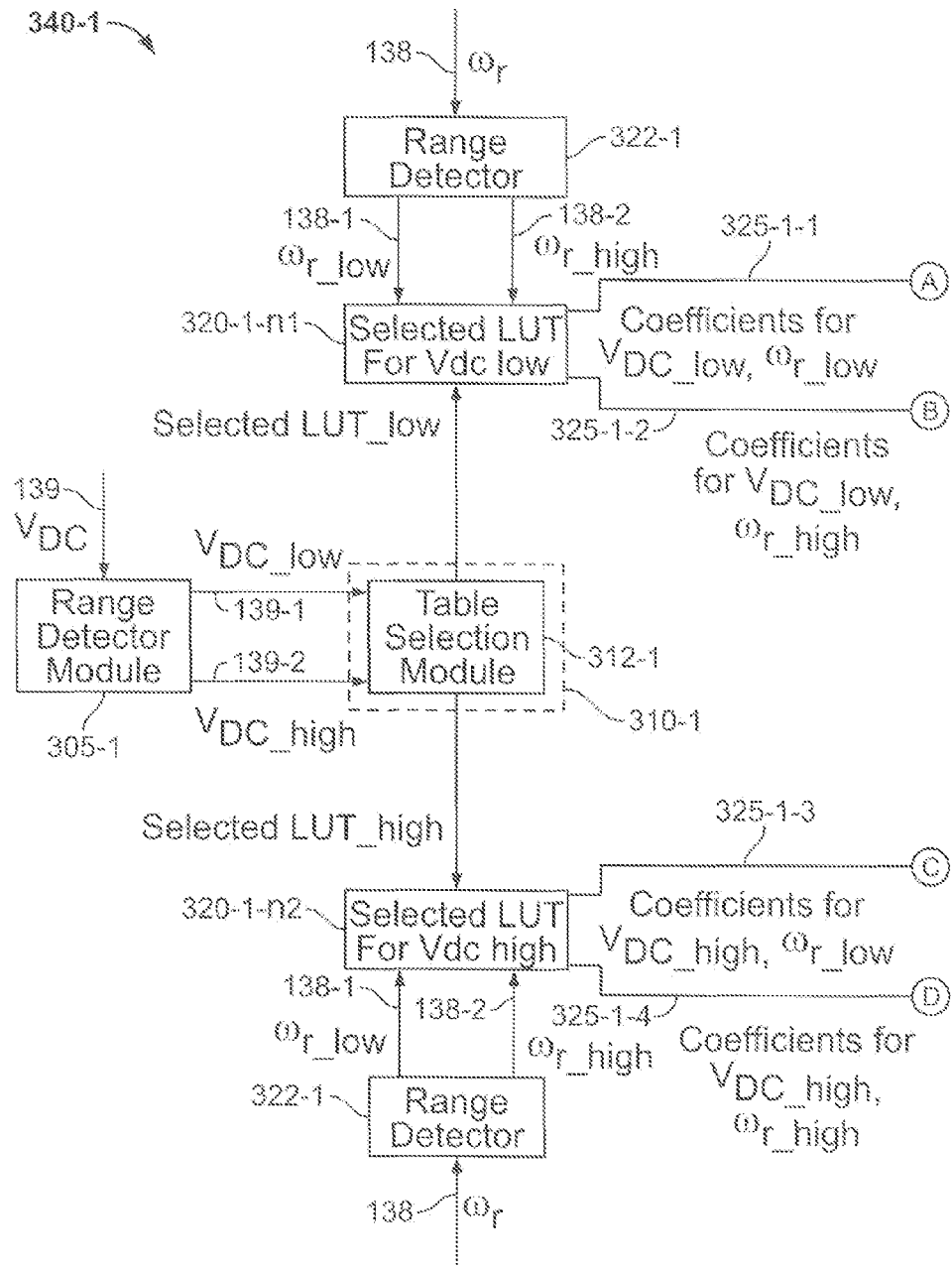
FIGS. 3A and 3B are block diagrams of a torque-to-current mapping module in accordance with one exemplary implementation of some of the disclosed embodiments.
Figures 2, 3A:
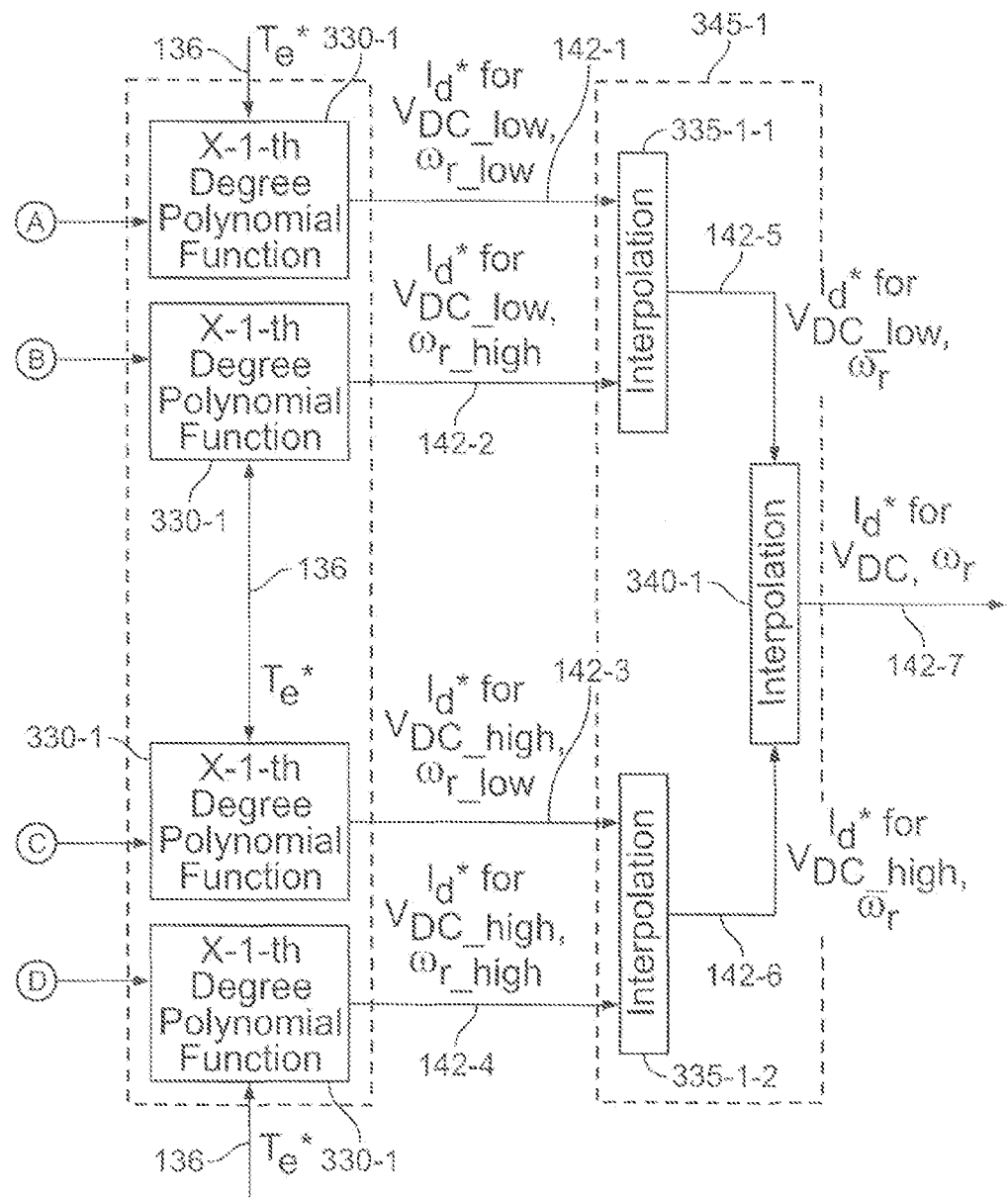
Figures 1, 3B:
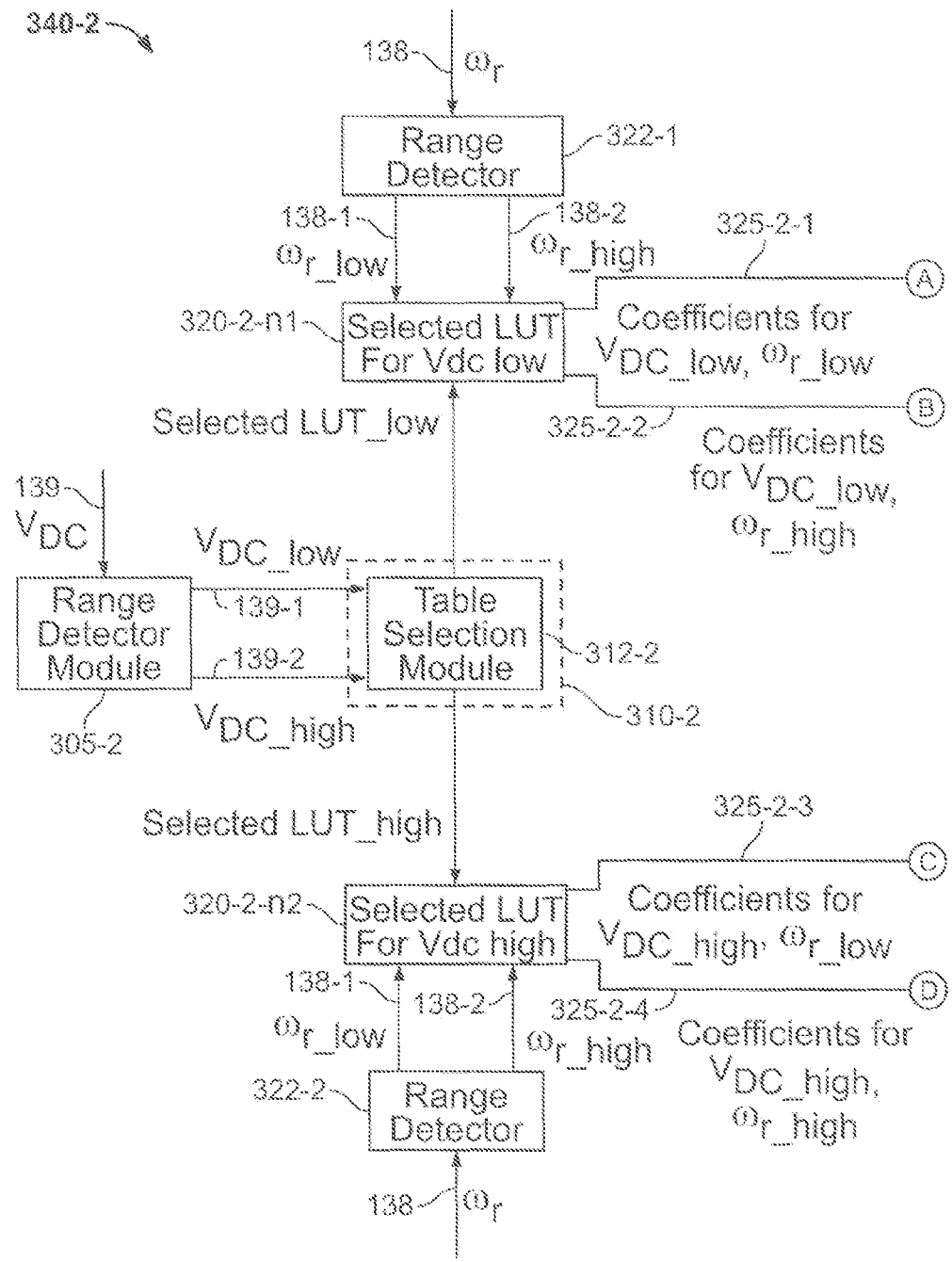
Figures 2, 3B:
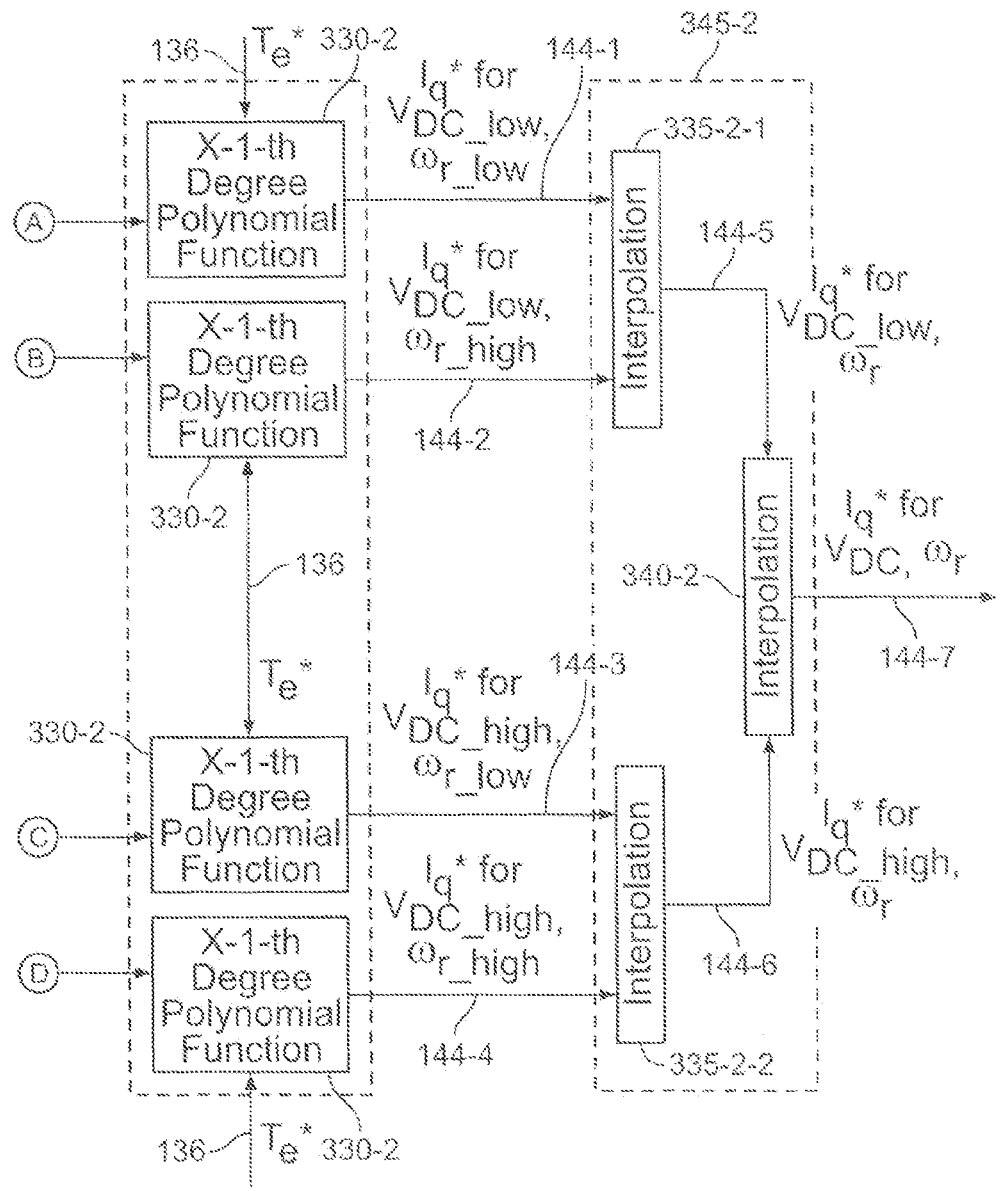

The description of the q-axis current command (Iq*) generator module 340-2 is similar, and for sake of brevity, will not be described below FIGS. 3A and 3B are block diagrams of a torque-to-current mapping module 340 in accordance with one exemplary implementation of some of the disclosed embodiments.

As shown in FIGS. 3A and 3B, the torque-to-current mapping module 340 includes a d-axis current command (Id*) generator module 340-1 and a q-axis current command (Iq*) generator module 340-2. The d-axis current command (Id*) generator module 340-1 includes a voltage range detector module 305-1, speed range detector modules 322-1, 322-2, a d-axis lookup table module 310-1, a first X–1th degree polynomial function module 330-1, and various interpolation modules 335-1-1, 335-1-2, 340-1. Similarly, the q-axis current command (Iq*) generator module 340-2 includes a voltage range detector module 305-2, speed range detector modules 322-1, 322-2, a q-axis lookup table module 310-2, a second X–1th degree polynomial function module 330-2, and various interpolation modules 335-2-1, 335-2-2, 340-2. The variable X is any number greater than 2. For example when X is seven (7), the polynomial functions that are implemented at polynomial function modules 330-1, 330-2 would be a $6^{th}$ degree polynomial function.

The d-axis current command (Id*) generator module 340-1 will now be described followed by a description of the q-axis current command (Iq*) generator module 340-2.

Generation of d-Axis Current Commands (Id*)

The voltage range detector module 305-1 receives the DC input voltage ($V_{DC}$) 139 and generates a lower end value of the DC input voltage ($V_{DC\_low}$) 139-1 and a higher end value of the DC input voltage ($V_{DC\_high}$) 139-2. The lower end value and the higher end value of the DC input voltage are those that closest to the actual DC input voltage ($V_{DC}$) 139. The voltage range detector module 305-1 can be used in embodiments where the lookup tables 310 are generated at increments of the DC input voltage ($V_{DC}$) 139 so that the number of LUTs 320 needed can be reduced. For example, in one implementation that can be used in conjunction with machines used in HEVs, each of the LUTs 320 may be generated at 50 volt increments.

The speed range detector module 322-1 receives the particular input value of the angular rotation speed ($\omega_r$) 138 of the machine, and generate a low input value of the angular rotation speed ($\omega_{r\_low}$) 138-1 of the machine and a high input value of the angular rotation speed ($\omega_{r\_high}$) 138-2 of the machine. The low input value and the high input value of the DC input voltage are those that closest to the actual angular rotation speed ($\omega_r$) 138 of the machine. The speed range detector module 322-1 can be used in embodiments where the lookup tables 310 are generated at increments of the angular rotation speed ($\omega r$) 138 so that the number of LUTs 310 needed can be reduced. For example, in one implementation that can be used in conjunction with machines used in HEVs, each of the LUTs 310 may be generated at 500 rpm increments.

The d-axis lookup table module 310-1 includes a first table selection module 312-1 and a first plurality (N) of one-dimensional lookup tables (LUTs) 310-1-1 ... 310-1-*n*. Each of the first plurality (N) of one-dimensional lookup tables (LUTs) 310-1-1 ... 310-1-*n* includes a plurality (B) of first entries. Each first entry comprises a number (X) of coefficients each being represented using a number (C) of bytes (e.g., 4 bytes per coefficient. Each first entry corresponds to a particular input value of the angular rotation speed (ωr) 138 of the machine out of a plurality (B) of possible input values for the angular rotation speed (ωr) 138, and a particular first set of X coefficients. In other words, each of the first plurality (N) of one-dimensional lookup tables (LUTs) 310-1-1 ... 310-1-*n* is map a particular input value of the angular rotation speed (ωr) 138 of the machine to a particular one of the plurality (B) of first entries that comprises a particular first set of X coefficients.

Based on the lower end value of the DC input voltage ($V_{DC\_low}$) 139-1, the first table selection module 312-1 selects a first selected one of the first plurality (N) of one-dimensional lookup tables (LUTs) 320-1-*n*1 that corresponds to the lower end value of the DC input voltage ($V_{DC\_low}$) 139-1. The selected table will be referred to herein as a "first selected one-dimensional LUT 320-1-*n*1." The first selected one-dimensional LUT 320-1-*n*1 maps the low input value of the angular rotation speed ($\omega_{r\_low}$) 138-1 of the machine to a first selected set of X coefficients ($V_{DC\_low}, \omega_{r\_low}$) 325-1-1 (i.e., a first particular one of the plurality (B) of first entries), and maps the high input value of the angular rotation speed ($\omega_{r\_high}$) 138-2 of the machine to a second selected set of X coefficients ($V_{DC\_low}, \omega_{r\_high}$) 325-1-2 (a second particular one of the plurality (B) of first entries).

Based on the higher end value of the DC input voltage ($V_{DC\_high}$) 139-2, the first table selection module 312-1 selects a second selected one of the first plurality (N) of one-dimensional lookup tables (LUTs) 320-1-*n*2 that corresponds to the higher end value of the DC input voltage ($V_{DC\_high}$) 139-2. This table will be referred to herein as a "second selected one-dimensional LUT 320-1-*n*2." The second selected one-dimensional LUT 320-1-*n*2 maps the low input value of the angular rotation speed ($\omega_{r\_low}$) 138-1 of the machine to a third selected set of X coefficients ($V_{DC\_high}, \omega_{r\_low}$) 325-1-3 (e.g., a third particular one of the plurality (B) of first entries), and maps the high input value of the angular rotation speed ($\omega_{r\_high}$) 138-2 of the machine to a fourth selected set of X coefficients ($V_{DC\_high}, \omega_{r\_high}$) 325-1-4 (a fourth particular one of the plurality (B) of first entries).

The first X–1th degree polynomial function module 330-1 is a function of a torque command signal (Te*) 136. For instance, in an example where the variable X is equal to six (6), the first $5^{th}$ degree polynomial function module 330-1 can execute a first $5^{th}$ degree polynomial function as shown in equation (1) to compute a d-axis current command (Id*) as follows:

$$Id^* C_5 \cdot (Te^*)^5 + C_3 \cdot (Te^*)^4 + C_3 \cdot (Te^*)^3 + C_2 \cdot (Te^*)^2 + C_1 \cdot (Te^*)^1 + C_0 \quad (1),$$

where the set of 6 coefficients is $C_0$ through $C_5$.

One instance of the first X–1th degree polynomial function module 330-1 implements the first selected set of X coefficients ($V_{DC\_low}, \omega_{r\_low}$) 325-1-1 within a first X–1th degree polynomial function, and upon receiving a particular input value of the torque command signal (Te*) 136, it generates a first particular output value for a d-axis current command (Id* for $V_{DC\_low}, \omega_{r\_low}$) 142-1 in response to the particular input value of the torque command signal (Te*) 136

Another instance of the first X–1th degree polynomial function module 330-1 implements the second selected set of X coefficients ($V_{DC\_low}, \omega_{r\_high}$) 325-1-2 within the first X–1th degree polynomial function, and upon receiving the particular input value of the torque command signal (Te*) 136, it generates a second particular output value for the d-axis current command (Id* for $V_{DC\_low}, \omega_{r\_high}$) 142-2 in response to the particular input value of the torque command signal (Te*) 136.

Another instance of the first X–1th degree polynomial function module 330-1 implements the third selected set of X coefficients ($V_{DC\_high}, \omega_{r\_low}$) 325-1-3 within the first X–1th degree polynomial function, and upon receiving the particular input value of the torque command signal (Te*) 136, it generates a third particular output value for the d-axis current command (Id* for $V_{DC\_high}, \omega_{r\_low}$) 142-3 in response to the particular input value of the torque command signal (Te*) 136.

Another instance of the first X–1th degree polynomial function module 330-1 implements the fourth selected set of X coefficients ($V_{DC\_high}, \omega_{r\_high}$) 325-1-4 within the first X–1th degree polynomial function, and upon receiving the particular input value of the torque command signal (Te*) 136, it generates a fourth particular output value for the d-axis current command (Id* for $V_{DC\_high}, \omega_{r\_high}$) 142-4 in response to the particular input value of the torque command signal (Te*) 136.

The various particular output values for the d-axis current command (Id*) 142-1 ... 142-4 for the different $V_{DC}, \omega_r$ values can then be interpolated to generate a final output value for the d-axis current command (Id* for $V_{DC}, \omega_r$) 142-7.

For example, in one implementation, a first interpolation module 335-1-1 can interpolate the first particular output value for a d-axis current command (Id* for $V_{DC\_low}, \Omega_{r\_low}$) 142-1 and the second particular output value for the d-axis current command (Id* for $V_{DC\_low}, \omega_{r\_high}$) 142-2 to generate a fifth particular output value for the d-axis current command (Id* for $V_{DC\_low}, \omega_r$) 142-5. Similarly, a second interpolation module 335-1-2 can interpolate the third particular output value for the d-axis current command (Id* for $V_{DC\_high}, \omega_{r\_low}$) 142-3 and the fourth particular output value for the d-axis current command (Id* for $V_{DC\_high}, \omega_{r\_high}$) 142-4 to generate a sixth particular output value for the d-axis current command (Id* for $V_{VD\_high}, \omega_r$) 142-6. A third interpolation module 340-1 can then interpolate the fifth particular output value for the d-axis current command (Id* for $V_{DC\_low}, \omega_r$) 142-5 and the sixth particular output value for the d-axis current command (Id* for $V_{DC\_high}, \omega_r$) 142-6 to generate the final output value for the d-axis current command (Id* for $V_{DC}, \omega_r$) 142-7.

The q-axis current commands (Iq*) are generated in a similar manner as will now be described below for sake of completeness.

Generation of q-Axis Current Commands (Iq*)

The third voltage range detector module 305-2 receives the DC input voltage ($V_{DC}$) 139 and generates a lower end value of the DC input voltage ($V_{DC\_low}$) 139-2 and a higher end value of the DC input voltage ($V_{DC\_high}$) 139-2.

The fourth speed range detector module 322-2 receives the particular input value of the angular rotation speed (ωr) 138 of the machine, and generates a low input value of the angular rotation speed ($\omega_{r\_low}$) 138-2 and a high input value of the angular rotation speed ($\omega_{r\_high}$) 138-2 of the machine.

The q-axis lookup table module 310-2 is similar to the d-axis lookup table module 310-2. The q-axis lookup table module 310-2 includes a second table selection module 312-2 and a second plurality (N) of one-dimensional lookup tables (LUTs) 310-2-1 . . . 310-2-n. Each of the second plurality (N) of one-dimensional lookup tables (LUTs) 310-2-1 . . . 310-2-n includes a plurality (B) of second entries. Each second entry comprises a number (X) of coefficients each being a number (C) of bytes. Each second entry corresponds to a particular input value of the angular rotation speed ($\omega r$) 138 of the machine out of a plurality (B) of input values for the angular rotation speed ($\omega r$) 138 of the machine, and includes a particular second set of X coefficients Each of the second plurality (N) of one-dimensional lookup tables (LUTs) 310-2-1 . . . 310-2-n maps a particular input value of the angular rotation speed ($\omega r$) 138 of the machine to a particular one of the plurality (B) of second entries that comprises a particular second set of X coefficients.

Based on the lower end value of the DC input voltage ($V_{DC\_low}$) 139-1, the second table selection module 312-2 selects a first selected one of the second plurality (N) of one-dimensional lookup tables (LUTs) 320-2-n1 that corresponds to the lower end value of the DC input voltage ($V_{DC\_low}$) 139-1, which will be referred to herein as a "third selected one-dimensional LUT 320-2-n1." The third selected one-dimensional LUT 320-2-n1 maps the low input value of the angular rotation speed ($\omega_{r\_low}$) 138-1 of the machine to a fifth selected set of X coefficients ($V_{DC\_low}$, $\omega_{r\_low}$) 325-2-1 (i.e., a first particular one of the plurality (B) of second entries), and maps the high input value of the angular rotation speed ($\omega_{r\_high}$) 138-2 of the machine to a sixth selected set of X coefficients ($V_{DC\_low}$, $\omega_{r\_high}$) 325-2-2 (i.e., a second particular one of the plurality (B) of second entries).

Based on the higher end value of the DC input voltage ($V_{DC\_high}$) 139-2, the second table selection module 312-2 selects a second selected one of the second plurality (N) of one-dimensional lookup tables (LUTs) 320-2-n2 that corresponds to the higher end value of the DC input voltage ($V_{DC\_high}$) 139-2, which will be referred to below as a "fourth selected one-dimensional LUT 320-2-n2." The fourth selected one-dimensional LUT 320-2-n2 maps the low input value of the angular rotation speed ($\omega_{r\_low}$) 138-1 to a seventh selected set of X coefficients ($V_{DC\_high}$, $\omega_{r\_low}$) 325-2-3 (i.e., a third particular one of the plurality (B) of second entries), and maps the high input value of the angular rotation speed ($\omega_{r\_high}$) 138-2 to an eighth selected set of X coefficients ($V_{DC\_high}$, $\omega_{r\_high}$) 325-2-4 (i.e., a fourth particular one of the plurality (B) of second entries).

The second X–1th degree polynomial function module 330-2 is a function of a torque command signal (Te*) 136.

One instance of the second X–1th degree polynomial function module 330-2 implements the fifth selected set of X coefficients ($V_{DC\_low}$, $\omega_{r\_low}$) 325-2-1 within a second X–1th degree polynomial function, and upon receiving a particular input value of the torque command signal (Te*) 136, it generates a first particular output value for a q-axis current command (Iq* for $V_{DC\_low}$, $\omega_{r\_low}$) 144-1 in response to the particular input value of the torque command signal (Te*) 136.

Another instance of the second X–1th degree polynomial function module 330-2 implements the sixth selected set of X coefficients ($V_{DC\_low}$, $\omega_{r\_high}$) 325-2-2 within the second X–1th degree polynomial function, and upon receiving a particular input value of the torque command signal (Te*) 136, it generates a second particular output value for the q-axis current command (Iq* for $V_{DC\_low}$, $\omega_{r\_high}$) 144-2 in response to the particular input value of the torque command signal (Te*) 136.

Another instance of the second X–1th degree polynomial function module 330-2 implements the seventh selected set of X coefficients ($V_{DC\_high}$, $\omega_{r\_low}$) 325-2-3 within the second X–1th degree polynomial function, and upon receiving a particular input value of the torque command signal (Te*) 136, it generates a third particular output value for the q-axis current command (Iq* for $V_{DC\_high}$, $\omega_{r\_low}$) 144-3 in response to the particular input value of the torque command signal (Te*) 136.

Another instance of the second X–1th degree polynomial function module 330—implements the eighth selected set of X coefficients ($V_{DC\_high}$, $\omega_{r\_high}$) 325-2-4 within the second X–1th degree polynomial function, and upon receiving a particular input value of the torque command signal (Te*) 136, it generates a fourth particular output value for the q-axis current command (Iq* for $V_{DC\_high}$, $\omega_{r\_high}$) 144-4 in response to the particular input value of the torque command signal (Te*) 136.

The various particular output values for the q-axis current command (Iq*) 144-1 . . . 144-4 for the different $V_{DC}$, $\omega_r$ values can then be interpolated to generate a final output value for the q-axis current command (Iq* for $V_{DC}$, $\omega_r$) 144-7.

For example, in one implementation, a fourth interpolation module 335-2-1 can interpolate the first particular output value for the q-axis current command (Iq* for $V_{DC\_low}$, $\omega_{r\_low}$) 144-1 and the second particular output value for the q-axis current command (Iq* for $V_{DC\_low}$, $\omega_{r\_high}$) 144-2 to generate a fifth particular output value for the q-axis current command (Iq* for $V_{DC\_low}$, $\omega_r$) 144-5. A fifth interpolation module 335-2-2 can interpolate the third particular output value for the q-axis current command (Iq* for $V_{DC\_high}$, $\omega_{r\_low}$) 144-3 and the fourth particular output value for the q-axis current command (Iq* for $V_{DC\_high}$, $\omega_{r\_high}$) 144-4 to generate a sixth particular output value for the q-axis current command (Iq* for $V_{DC\_high}$, $\omega_r$) 144-6. A sixth interpolation module 340-2 can then interpolate the fifth particular output value for the q-axis current command (Iq* for $V_{DC\_low}$, $\omega_r$) 144-5 and the sixth particular output value for the q-axis current command (Iq* for $V_{DC\_high}$, $\omega_r$) 144-6 to generate a final output value for the q-axis current command (Iq* for $V_{DC}$, $\omega_r$) 144-7.

Figure 4:
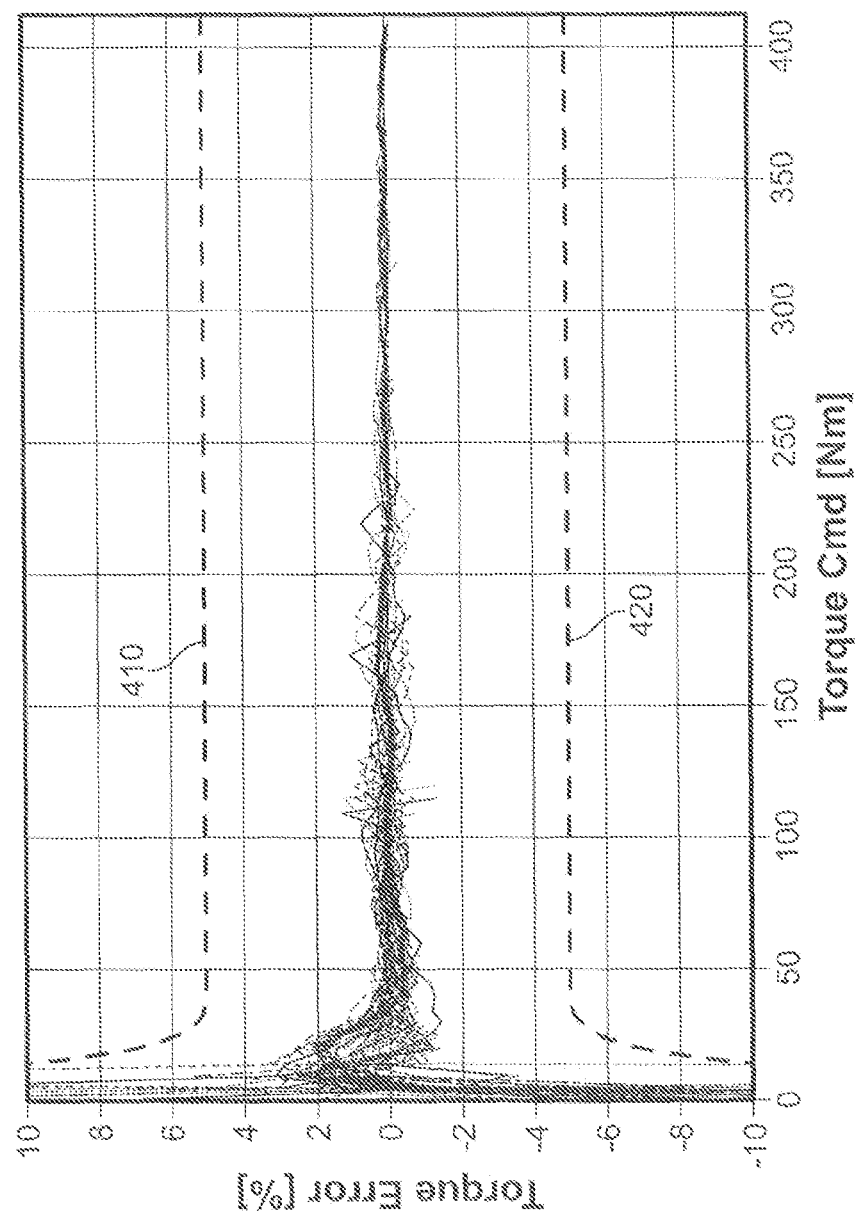
FIG. 4 is a set of graphs that illustrate torque error as a function of the torque command signal (Te*) as the particular input value of the torque command signal (Te*) varies in accordance with a simulation of one exemplary implementation of some of the disclosed embodiments.

FIG. 4 is a set of graphs that illustrate torque error as a function of the torque command signal (Te*) 136 as the particular input value of the torque command signal (Te*) 136 varies. In FIG. 4 the curves 410 and 420 represent maximum acceptable torque error, which is, in one implementation, either 5% of the commanded torque 136 or 1.5 Newton-meters, whichever is greater. The other set of curves represent the torque error as a function of the torque command signal (Te*) 136 for a particular angular rotation speed of the machine as the particular input value of the torque command signal (Te*) 136 varies in accordance with an exemplary simulation of the disclosed embodiments. As shown, in all cases the torque error of the disclosed embodiments is within the curves for maximum acceptable torque error 410, 420.

Comparison with One Conventional Approach

Thus, in the embodiment in FIG. 2, each LUT has B entries. Each entry includes a number (X) of coefficients, where each coefficient is represented using C-bytes. Thus each LUT requires B×X×C bytes to store information used to generate a set of X coefficients. In total, it takes 2×N×B×X×C bytes to store all of the LUTs used to generate the current commands. In one implementation, where X=6, B=49, and C=4 and N=12, it takes 28,224 bytes of memory to store each one of the LUTs. This is a very small amount of memory in comparison to that needed with conventional methods that employ different, larger LUTs and that do not employ the smaller disclosed LUTs in conjunction with the disclosed polynomial functions.

For example, in one conventional approach for torque-to-current mapping, a plurality (N) of two-dimensional lookup tables (LUTs) are employed. Each of the two-dimensional lookup tables (LUTs) includes a plurality (A×B) of first entries. Each first entry comprises a number (C) of bytes, and corresponds to: a particular input value of a torque command signal, a particular input value of an angular rotation speed of the machine, and a particular output value for a d-axis current command. In particular, each of the N two-dimensional lookup tables maps a particular input value of the torque command signal and a particular input value of the angular rotation speed of the machine to a particular one of a plurality (A×B) of first entries to generate an output value for a d-axis current command that corresponds to that particular one of the plurality (A×B) of first entries.

Likewise, a second plurality (N) of two-dimensional lookup tables (LUTs) are provided. Each one includes a plurality (A×B) of second entries, wherein each second entry comprises a number (C) of bytes. In particular, each second entry corresponds to a particular input value of the torque command signal, a particular input value of the angular rotation speed of the machine, and a particular output value for a q-axis current command. Each of the each of the second plurality (N) of two-dimensional lookup tables (LUTs) maps the particular input value of torque command signal and the particular input value of the angular rotation speed of the machine to a particular one of the plurality (A×B) of second entries to generate an output value for a q-axis current command that corresponds to that particular one of the plurality (A×B) of second entries.

Thus, in a conventional implementation like that described above, each LUT has A×B entries. Each entry in C bytes. Each LUT requires A×B×C bytes to store information used to generate one of the current commands In total, it takes 2×N×A×B×C bytes to store all of the LUTs used to generate the current commands For instance, in one implementation, where A=26, B=49, and C=4, and N=12, it takes 122,304 bytes of memory to store the LUTs.

In contrast to a conventional system like that described above, the current commands that are generated in accordance with the disclosed embodiments are clearly advantageous since they are still within acceptable error limits, but there is a 4.33 to one memory consumption when the conventional approach is compared to that of the disclosed embodiments. In other words, the disclosed embodiments consume significantly less memory than the conventional approach. In addition, the disclosed embodiments require only two interpolations compared to four interpolations required by the conventional approach.

Thus, various embodiments have been described for generating current commands used for controlling operation of a multi-phase machine in an electric motor drive system. In accordance with the disclosed embodiments, the memory or other storage resources used to generate current commands can be greatly reduced.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for mapping torque to current to generate a first current command, comprising:
    selecting, based on a DC input voltage, selected ones of a first plurality of lookup tables (LUTs), each comprising: a plurality of first entries, wherein each first entry comprises a set of coefficients that correspond to a corresponding input value of an angular rotation speed of an electric machine;
    outputting, in response to a particular input value of the angular rotation speed of the electric machine, a set of coefficients from each of the selected ones of the first plurality of LUTs;
    applying each of the sets of coefficients output from each of the selected ones of the first plurality of LUTs within a first polynomial function to generate a plurality of first polynomial functions each having a different one of the sets of coefficients, where each of the plurality of first polynomial functions is a function of a torque command signal; and
    generating particular output values for a first current command via each of the plurality of first polynomial functions in response to a particular input value of a torque command signal.

2. A method according to claim 1, wherein each of the first plurality of lookup tables (LUTs) is configured to map a particular input value of the angular rotation speed of the electric machine to a particular one of the plurality of first entries that comprises a particular first set of coefficients.

3. A method according to claim 1, further comprising:
    interpolating the particular output values for a first current command to generate a final output value for the first current command.

4. A method according to claim 1, wherein the first plurality of LUTs are each one-dimensional lookup tables (LUTs).

5. A method according to claim 1, wherein each set of coefficients comprises: a number (X) of coefficients, and wherein the first polynomial function comprises a first X–1th degree polynomial function, wherein the number X is greater than or equal to 2.

6. A torque-to-current mapping module, comprising:
    a first current command generator module comprising:
        a first plurality of lookup tables (LUTs), each comprising: a plurality of first entries, wherein each first entry comprises a set of coefficients;
        a table selection module configured to select, based on a DC input voltage, selected ones of the first plurality of LUTs, each of which are configured to output a set of coefficients in response to a particular input value of an angular rotation speed of an electric machine; and
        a polynomial function module that is a function of a torque command signal and that is configured to implement the sets of coefficients output from the selected ones of the first plurality of LUTs within a first polynomial function, and to generate, in response to a particular input value of a torque command signal, particular output values for a first current command.

7. A torque-to-current mapping module according to claim 6, wherein each first entry corresponds to the particular input value of the angular rotation speed of the electric machine out of a plurality of input values for the angular rotation speed of the electric machine, and a particular first set of coefficients.

8. A torque-to-current mapping module according to claim 7, wherein each of the first plurality of LUTs is configured to map a particular input value of the angular rotation speed of the electric machine to a particular one of the plurality of first entries that comprises a particular first set of coefficients.

9. A torque-to-current mapping module according to claim 6, wherein the table selection module is configured to select, based on the DC input voltage, a first selected LUT that is configured to output a first selected set and a second selected set of coefficients, and a second selected LUT that is configured to output a third selected set and a fourth selected set of coefficients.

10. A torque-to-current mapping module according to claim 6, further comprising:
    a first range detector module configured to receive the DC input voltage and generate a lower end value of the DC input voltage and a higher end value of the DC input voltage; and
    a second range detector module configured to receive the particular input value of the angular rotation speed of the electric machine, and generate a low input value of the angular rotation speed of the electric machine and a high input value of the angular rotation speed of the electric machine.

11. A torque-to-current mapping module according to claim 10, wherein the table selection module is configured to select:
    a first selected one of the first plurality of LUTs that corresponds to the lower end value of the DC input voltage, based on the lower end value of the DC input voltage, as a first selected LUT; and
    a second selected one of the first plurality (N) of lookup tables (LUTs) that corresponds to the higher end value of the DC input voltage, based on the higher end value of the DC input voltage, as a second selected LUT.

12. A torque-to-current mapping module according to claim 11, wherein the first selected LUT is configured to map the low input value of the angular rotation speed of the electric machine to a first selected set of coefficients and to map the high input value of the angular rotation speed of the electric machine to a second selected set of coefficients,
    wherein the second selected LUT is configured to map the low input value of the angular rotation speed of the electric machine to a third selected set of coefficients and to map the high input value of the angular rotation speed of the electric machine to a fourth selected set of coefficients.

13. A torque-to-current mapping module according to claim 11, wherein the polynomial function module is configured implement the first selected set of coefficients within a first polynomial function, to receive a particular input value of the torque command signal, and to generate a first particular output value for a first current command in response to the particular input value of the torque command signal, wherein the polynomial function module is configured implement the second selected set of coefficients within the first polynomial function, to receive the particular input value of the torque command signal, and to generate a second particular output value for the first current command in response to the particular input value of the torque command signal, wherein the polynomial function module is configured implement the third selected set of coefficients within the first polynomial function, to receive the particular input value of the torque command signal, and to generate a third particular output value for the first current command in response to the particular input value of the torque command signal, wherein the polynomial function module is configured implement the fourth selected set of coefficients within the first polynomial function, to receive the particular input value of the torque command signal, and to generate a fourth particular output value for the first current command in response to the particular input value of the torque command signal.

14. A torque-to-current mapping module according to claim 6, further comprising:

an interpolation processing module configured to interpolate the particular output values for a first current command to generate a final output value for the first current command.

15. A torque-to-current mapping module according to claim 14, further comprising:

a first interpolation module configured to interpolate the first particular output value for a first current command and the second particular output value for the first current command to generate a fifth particular output value for the first current command;

a second interpolation module configured to interpolate the third particular output value for the first current command and the fourth particular output value for the first current command to generate a sixth particular output value for the first current command; and a third interpolation module configured to interpolate the fifth particular output value for the first current command and the sixth particular output value for the first current command to generate a final output value for the first current command.

16. A torque-to-current mapping module according to claim 6, wherein the first plurality (N) of LUTs are each one-dimensional lookup tables LUTs.

17. A torque-to-current mapping module according to claim 6, wherein each set of coefficients comprises: a number (X) of coefficients, and wherein the first polynomial function comprises a first X−1th degree polynomial function, wherein the number X is greater than or equal to 2.

18. A torque-to-current mapping module according to claim 6, wherein the first current command is a d-axis current command, and wherein the first current command generator module is a d-axis current command generator module, wherein the table selection module is a first table selection module, wherein the polynomial function module is a first polynomial function module, and further comprising:

a q-axis current command generator module, comprising:
a second plurality of lookup tables (LUTs), each comprising: a plurality of second entries, wherein each second entry comprises another set of coefficients;
a second table selection module configured to select, based on the DC input voltage, selected ones of the second plurality of LUTs, each of which are configured to output a set of coefficients in response to the particular input value of the angular rotation speed of the electric machine;
a second polynomial function module that is a function of the torque command signal and that is configured implement the sets of coefficients output from the selected ones of the second plurality of LUTs within a second polynomial function, and to generate, in response to the particular input value of the torque command signal, particular output values for a q-axis current command.

19. A torque-to-current mapping module according to claim 18, wherein the first current command is the d-axis and q-axis current commands are synchronous reference frame d-axis and q-axis current commands that are DC commands that have a constant value as a function of time.

20. A current command generator module, comprising:

a first plurality of one-dimensional lookup tables (LUTs), each comprising: a plurality of first entries, wherein each first entry corresponds to a particular input value of an angular rotation speed of an electric machine, and where each first entry comprises a particular first set of coefficients, wherein each particular first set of coefficients comprises: a number (X) of coefficients that is greater than or equal to 2;

a table selection module configured to select, based on a DC input voltage, selected ones of the first plurality of one-dimensional LUTs, each of which are configured to output a set of coefficients in response to a particular input value of an angular rotation speed of an electric machine;

a polynomial function module that is a function of a torque command signal and that is configured to implement the sets of coefficients output from the selected ones of the first plurality of one-dimensional LUTs within a first X−1th degree polynomial function, and to generate, in response to a particular input value of a torque command signal, particular output values for a first current command; and an interpolation processing module configured to interpolate the particular output values for a first current command to generate a final output value for the first current command.

* * * * *